United States Patent
Sperna Weiland (12)

(10) Patent No.: US 6,253,967 B1
(45) Date of Patent: Jul. 3, 2001

(54) ASSEMBLY COMPRISING A FLEXIBLE CONTAINER HAVING A DOSING DEVICE AND DOSING DEVICE OF SUCH ASSEMBLY

(75) Inventor: Jan Adolf Ernst Sperna Weiland, Deventer (NL)

(73) Assignee: Sara Lee/De N.V., Utecht (NL)

( * ) Notice: Subject to any disclaimer, the term of this patent is extended or adjusted under 35 U.S.C. 154(b) by 0 days.

(21) Appl. No.: 09/463,928

(22) PCT Filed: Jul. 31, 1998

(86) PCT No.: PCT/NL98/00444

§ 371 Date: Apr. 4, 2000

§ 102(e) Date: Apr. 4, 2000

(87) PCT Pub. No.: WO99/06803

PCT Pub. Date: Feb. 11, 1999

(30) Foreign Application Priority Data

Aug. 1, 1997 (NL) .................................................. 1006707
Sep. 12, 1997 (NL) .................................................. 1007030
May 12, 1998 (NL) .................................................. 1009141

(51) Int. Cl.$^7$ ........................................................ B67D 3/06
(52) U.S. Cl. ........................ 222/205; 222/207; 222/430
(58) Field of Search ................................... 222/205, 207, 222/211, 430, 434, 435, 438, 439, 440

(56) References Cited

U.S. PATENT DOCUMENTS 4,747,521 * 5/1988 Saffron ................................... 222/205

FOREIGN PATENT DOCUMENTS

| 1 075 967 | 2/1960 | (DE) . |
| 27 52 669 | 5/1979 | (DE) . |
| 39 40 534 | 6/1991 | (DE) . |
| 43 05 390 | 1/1994 | (DE) . |
| 0 087 016 | 8/1983 | (EP) . |
| 2 183 217 | 6/1987 | (GB) . |
| WO 96/03625 | 2/1996 | (WO) . |

* cited by examiner

Primary Examiner—Philippe Derakshani
Assistant Examiner—Thach H Bui
(74) Attorney, Agent, or Firm—Merchant & Gould P.C.

(57) ABSTRACT

The assembly comprises a flexible container in which liquid can be stored and a dosing device connected to the container for dispensing liquid from the container in a dosed manner. The dosing device comprises a filling chamber and means for filling the filling chamber from the container at a selectively settable filling height by squeezing the container. The filling chamber comprises a filling chamber bottom, a vertical sidewall and at least a first and a second channel which each extends upwards from the filling chamber bottom of the filling chamber and each has an inflow opening and an outflow opening. The dosing device further comprises a base bottom connected to the container, the entire filling chamber being rotatably mounted on the base bottom. The base bottom is provided with a through-flow opening which, via a feed line, is in fluid connection with the inner space of the container, while the inflow opening of the first or second channel can selectively be brought into fluid connection with the through-flow opening by rotation of the filling chamber relative to the base bottom.

17 Claims, 11 Drawing Sheets

ASSEMBLY COMPRISING A FLEXIBLE CONTAINER HAVING A DOSING DEVICE AND DOSING DEVICE OF SUCH ASSEMBLY

The invention relates to an assembly comprising a flexible container having an inner space in which liquid can be stored and a dozing device connected to the container tor dispensing liquid from the container in a dosed manner, the dosing device comprising a filling chamber and means for filling the filling chamber from the container at a selectively settable filling height by squeezing the container.

The invention also relates to a dosing device of such assembly.

Such assembly is known inter alia from international patent application 9603625. The container can be filled with an antifreeze for windscreen wipers and other liquids intended to be dispensed in accurately predetermined quantities. In use, the flexible container is squeezed for this purpose. This will cause the filling chamber to be filled via a feed line system. When the squeezing of the container is subsequently ended, the container will return into its original shape again, while liquid will be sucked back from the filling chamber into the inner space of the container. However, when the liquid level in the filling chamber has dropped to the outflow opening of the feed line system, the feed line system will draw in air rather than liquid. consequently, the filling chamber will be filled to a height corresponding to the height of the outflow opening of the feed line system. Next, the assembly can be placed upside down to cause the liquid to flow from the filling chamber. In this manner, a dosed quantity of liquid is dispensed.

For setting the filling height of the filling chamber, the feed line system of the known assembly is built, up from two tubes which are telescopically interconnected. By moving an upper one of the two tubes up and down relative to the lower one, the height of the outflow opening of the upper tube can be wet relative to a bottom of the filling char in a stepless fashion.

A drawback of the known assembly is that setting the filling height by manually moving the upper conduit up and down relative to the lower conduit involves a great inaccuracy. Moreover, the setting operation often proceeds rather stiffly and jerkily, so that it takes relatively much time and effort to set the filling height in an accurate manner.

It is an object of the invention to overcame the above drawback and the invention is characterized it that the dosing device further comprises a base bottom connected to the container, a filling chamber bottom of the filling chamber being rotatably mounted on the base bottom, the filling chamber comprising at least a first and a second channel which each extend upwards from a filling chamber bottom of the filling chamber and which are each provided with an inflow opening and an outflow opening and the base bottom being provided with a through-flow opening which, via a feed line, is in fluid connection with the inner space of the container, while the inflow opening of the first or second channel can selectively be brought into fluid connection with the through-flow opening by rotation of the filling chamber bottom relative to the base bottom, the outflow opening of the first channel being located at a first height relative to the filling chamber bottom when the inflow opening of the first channel is connected to the through-flow opening and the outflow opening of the second channel being located at a second height relative to the filling chamber bottom when the inflow opening of the second channel is connected to the through-flow opening, and the first and the second height differing from each other.

As in accordance with the invention, the first and the second height are directly determined by the two channels, the user knows precisely which quantities of liquid will be dispensed in a dosed manner. In particular, the device comprises a large number of channels, each having an outflow opening which, when the relevant piece of line in connected to the inflow opening, is located at a predetermined height relative to the filling chamber bottom. In this manner, through selection of a channel, a corresponding discrete quantity of liquid that is to be dispensed in a dosed manner can be set. Each channel can correspond to a predetermined quantity of liquid. The accuracy of the dosing device may be better than 1 per cent.

In accordance with the invention, the filling chamber bottom is rotatably connected to the base bottom. This construction is particularly robust, accurate and reliable. As a result, the risk of liquid leaking away from the filling chamber is minimal.

Preferably, it applies that the filling chamber further comprises a vertical sidewall which is fixedly connected to the filling chamber bottom, so that the entire filling chamber is rotatable relative to the base bottom.

Liquid located in the filling chamber can then flow back into the container only via an outflow opening of the selected channel. Also if the seal between the through-flow opening and the inflow opening were not entirely liquid-tight, liquid leaking away from the filling chamber would flow back into the container only via the selected channel.

Hence, apart from this seal, the filling chamber comprises no further seals which interconnect parts that are rotatable relative to each other in a liquid-tight manner. This meant that it is not possible that liquid leaks away from the filling chamber to the container or to another position outside the filling chamber.

In particular, according to the invention, the first and second channels have a difference in length corresponding to the height difference between the first and the second height. Hence, the channels arranged for filling the chamber only slightly are not unnecessarily long. This saves material and prevents fouling and clogging of parts of channel which, in use, are little or not flowed through.

In particular, the first and the second outflow opening are arranged adjacent a top side of the first and the second channel respectively. This has as an advantage that, in use, the entire channel is flowed through, so that fouling and clogging of that channel do not occur. Further, a starting point and an and point of the channel coincide with the inflow opening and the outflow opening respectively of the channel, enabling the entire channel to be properly aerated during the draining of the channel.

Further, it is advantageous when the first and second channel each deflect radially outwards relative to the rotary axis of the filling chamber. This prevents the situation that when the bottle is squeezed, the liquid is spouted to a top side of the liquid chamber and here sticks to an inner wall of the filling chamber, causing the dosing to become less accurate.

In accordance with a preferred embodiment of the assembly, the inflow opening of the first and second channel is provided in the filling chamber bottom of the filling chamber. This renders the dosing device particularly durable.

Preferably, the filling chamber has its top side provided with a top wall having a pour-out opening, the top wall being fixedly connected to the sidewall. This means that the filling chamber, at its top side, is not provided with a seal between rotatable parts which, during pouring out, could start leaking.

In particular, the dosing device further comprises a cap for closing off the pour-out opening. This cap prevents the assembly from emptying when it is not used and for instance lies on its side.

In accordance with another aspect of the invention, at least in one rotational position of the filling chamber bottom, none of the channels is connected to the through-flow opening, so that the container is closed off from the filling chamber. Thus, leaking of liquid from the container when it is not used, is entirely ruled out. Together with the cap, a double safety is thus obtained.

In accordance with a highly advanced embodiment of the assembly, a tubular housing is arranged in the filing chamber, which tubular housing extends upwards from the filling chair bottom and is fixedly connected to the filling chamber bottom, the tubular housing comprising a circular inner wall and a circular outer wall, the first and the second channel being arranged in the tubular housing between the inner wall and the outer wall and, in use, the filling chamber being filled in a space of the filling chamber located between the vertical wall of the filling chamber and the outer wall of the tubular housing, and in a space of the filling chamber enclosed by the inner wall of the tubular housing. This construction is durable, but also relatively simple to manufacture via an injection-molding process. Moreover, optimum use is made of the volume of the filling chamber in that the filling chamber can be filled with liquid both in a space of the filling chamber located between the vertical wall of the filling chamber and the outer wall of the tubular housing, and in a space of the filling chamber enclosed by the inner wall of the tubular housing.

Preferably, the through-flow opening has a through-flow area smaller than 2 square millimeters. The effect thus achieved is that the magnitude of the flow of liquid from the container to the filling chamber has an upper limit. Also when the bottle is squeezed relatively firmly, the liquid is prevented from spouting into the filling chamber at an unduly high speed. If this actually happened, there would be the risk of the liquid chamber flowing over, causing liquid to be spilled. On the other hand, the flowback of excess liquid from the filling chamber to the container is not unnecessarily delayed.

The provision of the restriction in the through-flow opening moreover has the advantage that it is used for any channel and hence for any filling height. As the restriction, i.e. the through-flow opening with said limited size of the through-flow area, is at a low position relative to th outflow opening of the selected channel, foam formation is the liquid during the filling of the filling chamber is prevented. This is particularly desirable for the liquids of the container that are meant tor consumption.

This effect is further optimized when the height of the through-flow opening in the base bottom is less than 2 mm and more than 1 mm.

The invention will now be specified with reference to the accompanying drawings. In these drawings.

The assembly 1 according to FIGS. 1–6 comprises a flexible container 2 having an inner space 4 in which liquid 6 can be stored. The assembly further comprises a dosing device 8 for dispensing the liquid 6 from the container 2 in a dosed manner. The dosing device a is provided with a filling chamber 10 comprising a filling chamber bottom 12 and a vertical sidewall 14. The vertical sidewall 14 is preferably fixedly connected to the filling chamber bottom 12, so that the entire filling chamber 10 is rotatably mounted on the base bottom 16. The filling chamber bottom 12 is rotatably mounted on a base bottom 16 which is fixedly connected to the container 2. via a feed line system, the filling chamber 10 is in fluid connection with the inner space 4 of the container 2. In this example, the feed line system consists of a feed line 18 extending from the inner space 4 of the container 2 to a through-flow opening 20 in the base bottom 16. The feed line system further comprises a number of channels $22.i$ (i–1, 2, 3, 4, 5) which are separate from each other and are each mechanically connected to the filling chamber bottom 12. Each channel $22.i$ has an inflow opening $24.i$ located in the filling chamber bottom 12. Further, each channel $22.i$ has an outflow opening $26.i$.

Together with the channels $22.i$, the filling chamber bottom 12 is rotatably connected to the base bottom 16. Hence, the filling chamber bottom 12 and the channels $22.i$ in combination constitute a rotation element which is rotatably connected to a housing comprising the base bottom 16. The filling chamber 10 has its top side provided with a top wall 28 in which a pour-out opening 30 is provided. The top wall 28 is fixedly connected to the vertical sidewall 14 of the filling chamber. The filling chamber is further provided with an outer wall 32 extending downwards from the top wall 28 and outwards in radial direction. In use, the outer wall 32 can be gripped for rotating the entire filling chamber, including filling chamber bottom 12 and the channels $22.i$, relative to the base bottom 16 for selecting one of the channels $22.i$.

The channels $22.i$ are connected to the filling chamber bottom 12 in such position that the inflow opening of each channel $22.i$ can selectively be brought into fluid connection with the through-flow opening 20 by a rotation of the filling chamber bottom 12. Hence, the feed line 18 can selectively be brought into fluid connection with one of the outflow openings $26.i$ (i=1, 2, 3, 4, 5) of the respective channels $22.i$.

In this example, the channels $22.i$ each have a different length. Moreover, the pieces of line are of straight design and are each at least substantially vertically directed. Further, it applies that the outflow openings are arranged adjacent an upper free end of the pieces of line. The above implies that the outflow openings $26.i$ always have mutually different heights relative to the filling chamber bottom 12. In other words, to a first channel $22.i$ and a second channel $22.j$, wherein i is unequal to j, it applies that the outflow opening of the first channel 22.*i* is located at a first height relative to the filling chamber bottom 12 when the first channel is connected to the through-flow opening, and an outflow opening 26.*j* of the second channel 22.*j* is located at a second height relative to the filling chamber bottom 12 when the second channel 22.*j* is connected to the through-flow opening 20, the first and the second height differing from each other.

In use, the inner space 4 is aerated only via the feed line system. The filling chamber 10 can further be manipulated into a rotational position such that none of the channels 22.*i* is connected to the through-flow opening 20, i.e. to the feed line 18. This is the case when through rotation of the filling chamber bottom, a vertical log 34 (see FIG. 6) connected to the filling chamber bottom 12 in manipulated into a position above the feed line 18.

Figure 1:
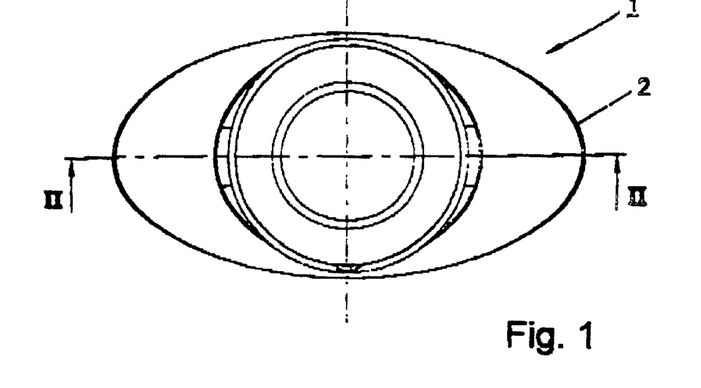
FIG. 1 is a top plan view of a first possible embodiment of an assembly according to the invention.
Figure 2:
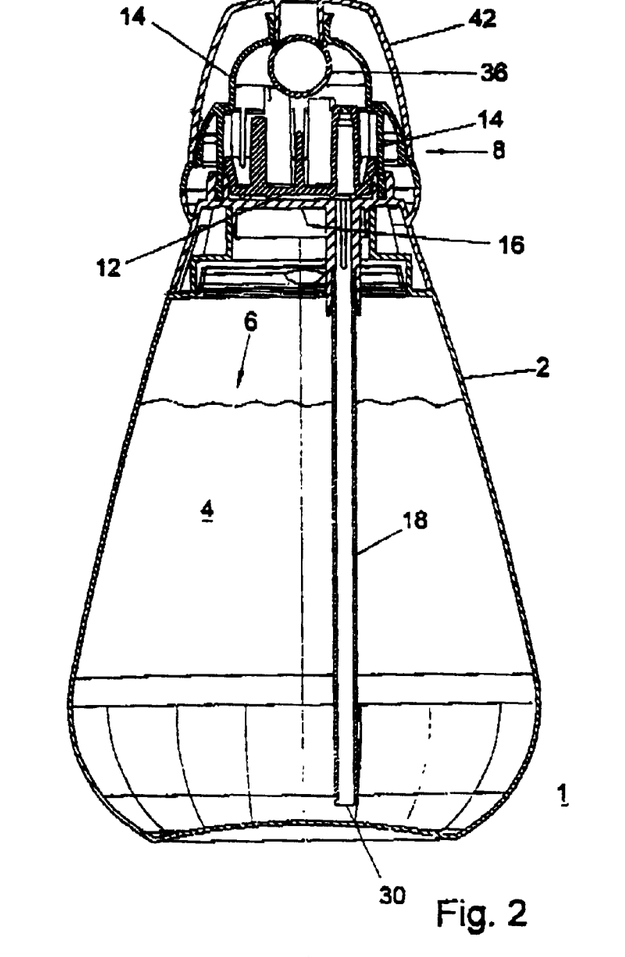
FIG. 2 shows a cross section taken on the line A—A of FIG. 1.
Figure 3:
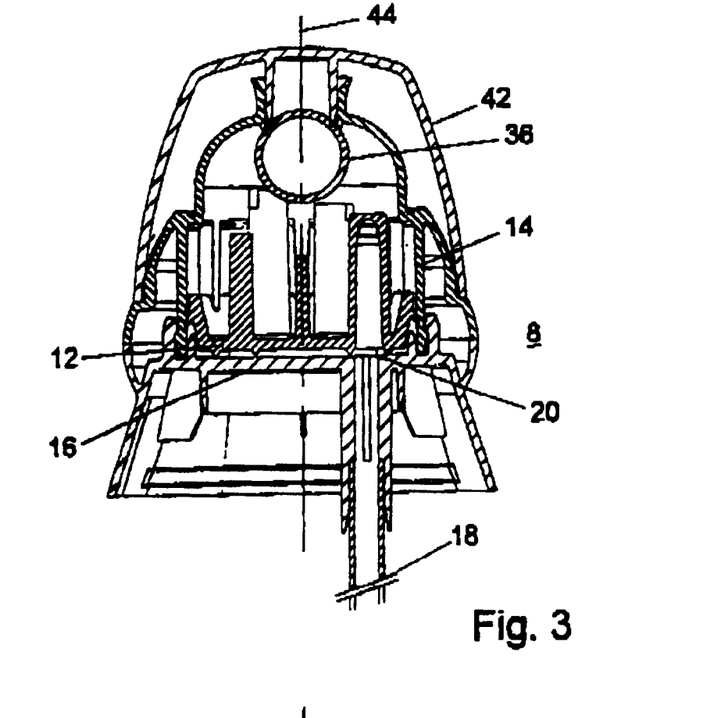
FIG. 3 shows a cross section of the dosing device of the assembly according to FIG. 1 taken on the line A—A of FIG. 1.
Figure 4:
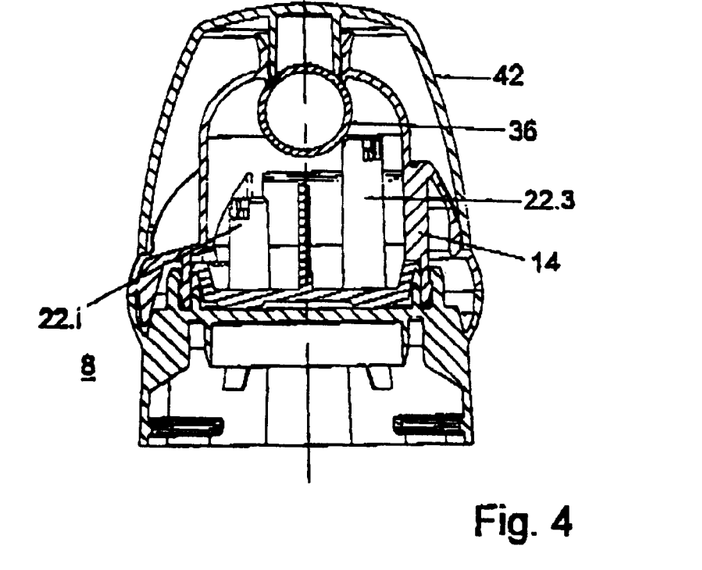
FIG. 4 shows a cross section of the dosing device according to FIG. 3 taken on the line B—B of FIG. 1.
Figure 5:
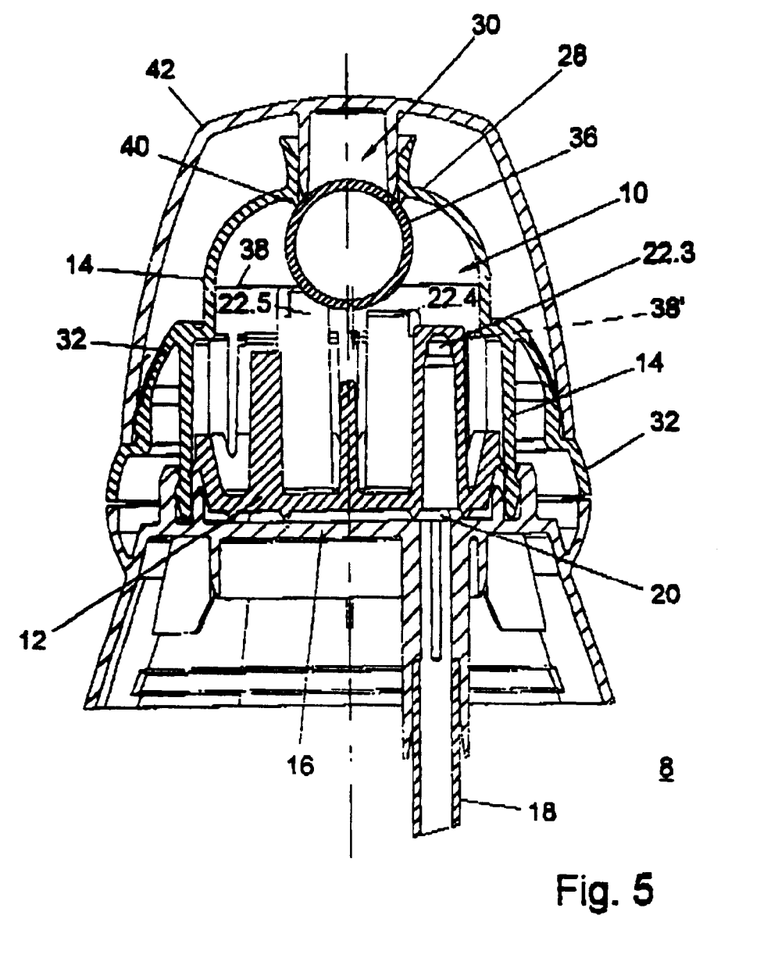
FIG. 5 shows a part of FIG. 3.
Figure 6:
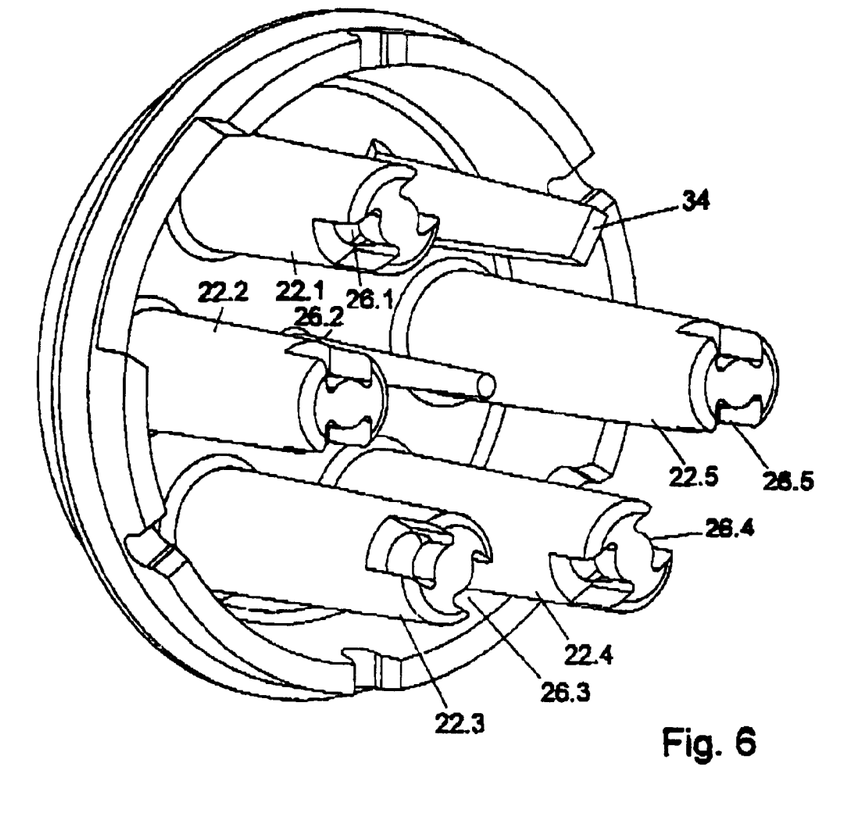
FIG. 6 shows, in perspective, a part of the dosing device of the assembly according to FIG. 1.
Figure 7:
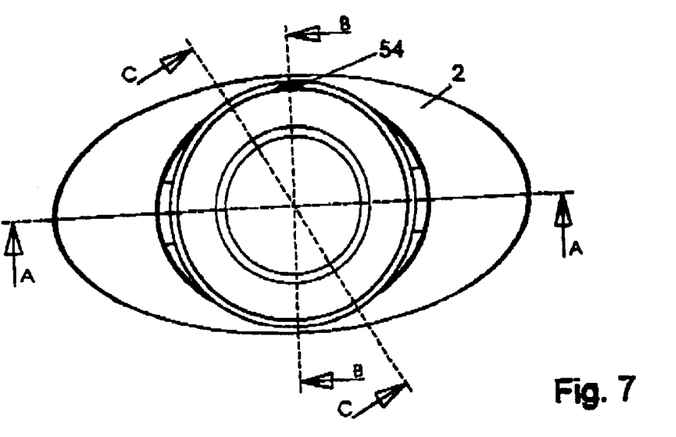
FIG. 7 is a top plan view of a possible second embodiment of an assembly according co the invention.
Figure 8:
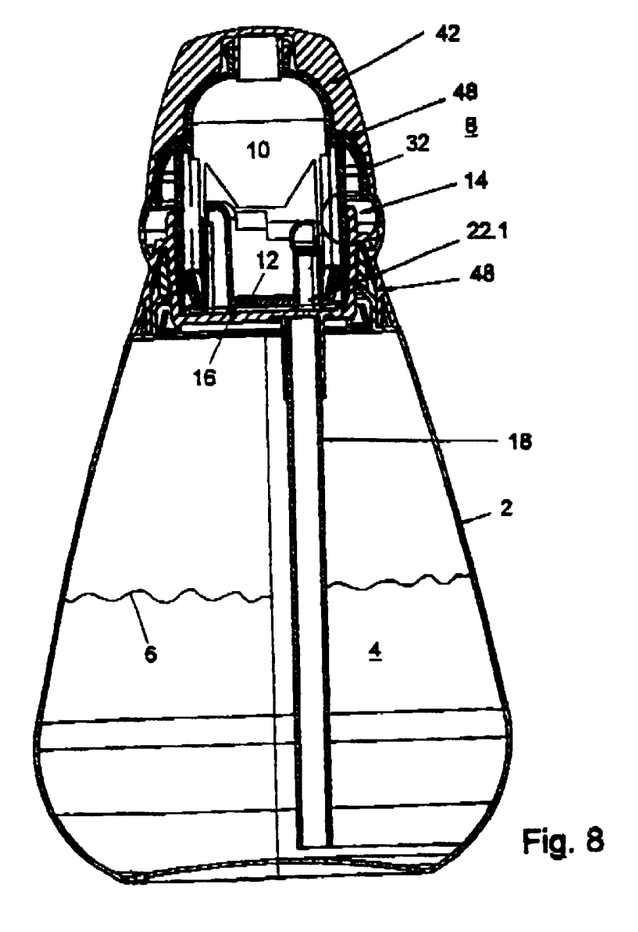
FIG. 8 a shows a cross section taken on the line A—A of FIG. 7.
Figure 9:
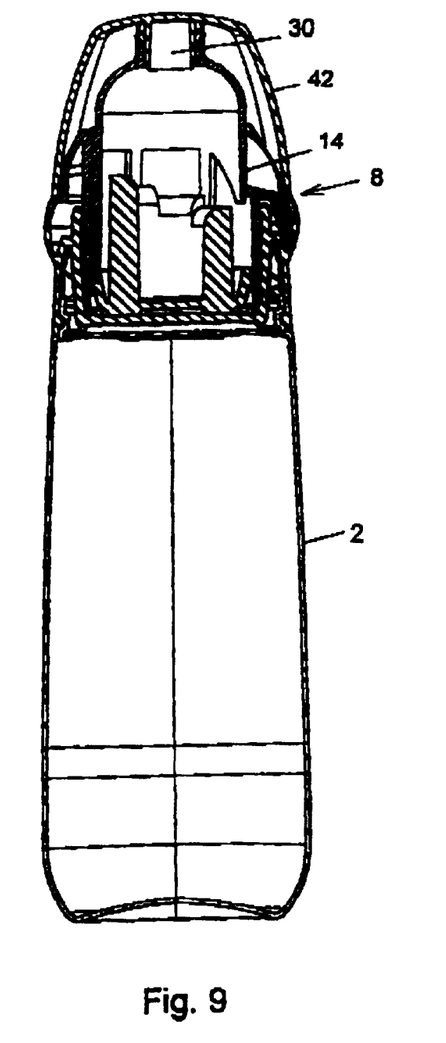
FIG. 9 shows a cross section taken on the line B—B of FIG. 7.
Figure 10:
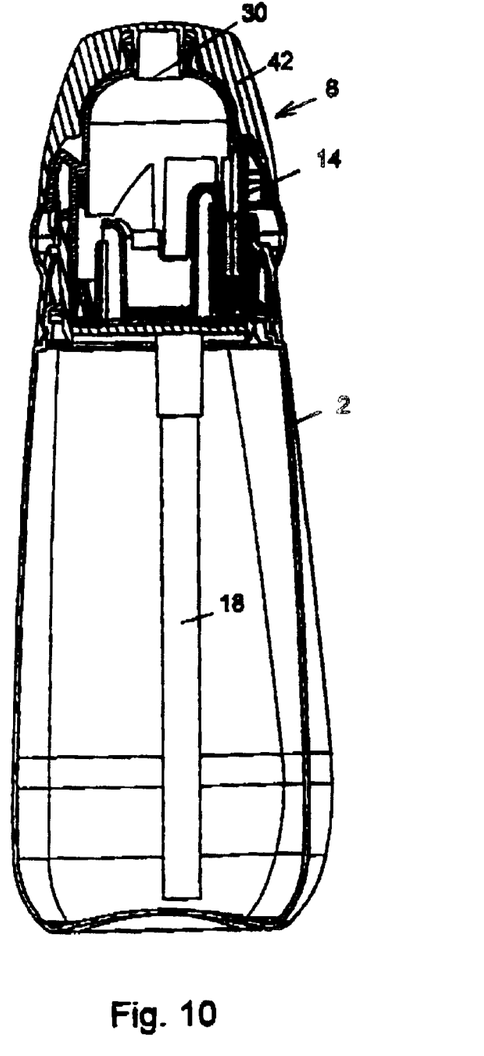
FIG. 10 shows a cross section taken on the line C—C of FIG. 7.

The device further comprises closing means closing the pour-out opening 30 when the maximum filling height of the chamber is exceeded. To this end, the closing means comprise a floating element 36 which, in this example, is of ball-shaped design. The floating element is located in the filling chamber 10 under the pour-out opening 30.

The operation of the device is as follows. A user first selects one of the channels 22.*i* for filling the filling chamber 10. With this, the filling height of the filling chamber 10 is set at the same time. By setting the filling height of the filling chamber 10, the quantify of liquid is determined which is eventually dispensed by the assembly. After for instance the channel 22.3 has been manipulated into a position above the feed line 18 through rotation of the filling chamber bottom 12, a user squeezes the flexible container 2. Now, a liquid flow path from the inner space 4 to the filling chamber 10 extends through the feed line 18 and the channel 22.3 and ends at the outflow opening 26.3 of the channel 22.3. Liquid will now flow from the inner space 4 into the filling chamber 10 via the feed line 18 and the channel 22.3 A user squeezes the container 2 such that an excess of liquid is introduced into the filling chamber 10. The liquid level 46 is then at a height above the outflow opening 26 of the channel 22.3. When after the filling of the filling chamber 10, a user subsequently stops squeezing the container 2. the container 2 will be apt to return into its original condition again. Consequently, the container 2 starts to suck liquid from the filling chamber 10 back into the inner space 4 of the container 2 via the feed line 18 and the channel 22.3. Accordingly, the liquid level 38', i.e. the height of the liquid level relative to the filling chamber bottom 12, starts to drop. However, when the liquid level 38' has dropped to the outflow opening 26.3, no further liquid will flow back from the filling chamber into the inner space 4 of the container 2. Instead, the container will further be filled with air via the outflow opening 26.3. The liquid level 46 is then exactly flush with the outflow opening 26.3. In this manner, the height of the outflow opening 26.3 determines the quantity of liquid that eventually stays behind in the filling chamber 10 after a user has squeezed the flexible container 2 and subsequently allowed it to expand again.

Next, a user can place the assembly upside down, enabling the filling chamber 10 to drain via the pour-out opening 30, so that hence a predetermined quantity of liquid is dispensed by the assembly in a dosed manner.

When a user subsequently wishes to dispense a different quantity of liquid, he can select another channel 22.*i* corresponding to said quantity. In this example, it applies that for an increasing value of i, a larger quantity of liquid is dosed. As the height of the channel 22.*i* is accurately predetermined, a user knows precisely which quantity of liquid will be dispensed by the assembly.

When, for whatever reason, a user squeezes the container 2 particularly powerfully, the filling chamber 10 is filled particularly quickly. This would involve the risk of the filling chamber flowing over via the pour-out opening 30. However, this will no: happen. because in that case, the liquid level 46 will cause the floating element 36 to move upwards. Eventually, the floating element 36 will close off the pour-out opening 30, as shown in FIG. 2. When the floating element 36 closes off the pour-out opening 30. liquid cannot be squeezed from the pour-out opening 30. Moreover, the liquid level of the filling chamber 10 cannot be filled any further, because in the filling chamber 10 and, accordingly, in the inner space 4, a pressure i; created which opposes the further impression of the flexible container 2. In this example, an annular edge 40, closed in itself, in provided on the inside of the filling chamber, around the pour-Out opening 30. This annular edge 40 on the one hand provides a proper closure with the floating element 36. On the other hand, the edge 40 provides that the floating element 36 does not stick to the pour-out opening 30 when the bottle is released and the liquid flows partially back again from the filling chamber 10 to the inner space 4 of the container 2. The floating element 36 will then move down relative to the edge 40 under its weight and floating on the dropping liquid level 46, causing the pour-out opening 30 to be cleared again.

In this example, the floating element 36 therefore constitutes a closing means in which the floating element is moved upwards by the liquid in the filling chamber when the filling height of the filling chamber exceeds a predetermined m mum value. In this example, said predetermined maximum value is partially determined by the dimensions of the floating element.

In this example, the dosing device further comprises a removable closing cap 42. The closing cap 42 is detachably connected to the top wall 28.

The assembly 1 according to FIGS. 7–13 is also provided with a flexible container 2 with an inner space 4 in which liquid 6 can be stored. The assembly further comprises a dosing device 8 connected to the container for dispensing the liquid 6 from the container 2 in a dosed manner. The dosing device 8 comprises a filling chamber 10 and means for filling the filling chamber 10 from the container 2 at a selectively settable filling height by squeezing the container, which means will be discussed in more detail hereinbelow. The filling chamber comprises a filling chamber bottom 12 and a circular, vertical sidewall 14. The filling chamber bottom 12 and the vertical sidewall 14 are fixedly interconnected and together bound an inner space 4 of the filling chamber 10. The filling chamber further has its top side provided with a top wall 28 which is likewise fixedly connected to the vertical sidewall 14. In fact, this means that at its top side, the vertical sidewall 14 is bent over and blends with the top wall 28. Provided in the top wall 28 is a pour-out opening 30 which, in this example, is closed off with a removable cap 42.

The dosing device further comprises a base bottom 16 connected to the container 2.

The filling chamber further comprises at least two channels 22.*i* (i=1, 2, . . . ) which each extend upwards in vertical direction from the filling chamber bottom 12. Bach channel is provided with an inflow opening 24.*i* and an outflow opening 26.*i*. In this example, the inflow openings 24.*i* of the channels 22.*i* are provided in the filling chamber bottom 12. The channels 22.*i* are fixedly connected to the filling chamber bottom 12 and manufactured from the same material. Again, it applies that the filling chamber bottom 12 is rotatably mounted on the base bottom IC. Hence, the filling chamber bottom 12 and the channels 22.i in combination constitute a rotation element which is rotatably connected to a housing comprising the base bottom 16. In this example, it moreover applies that the entire filling chamber, comprising the filling chamber bottom 12, the vertical sidewall 14, the top wall 28 and the channels 22.i, is mounted on the base bottom 16 for rotation about an axial axis 44 of the filling chamber.

In this example, the outflow openings 26.i of the channels 22.i are provided adjacent a top side of the channels 22.i. At their top sides, each of the channels 22.i deflects outwards in radial direction relative to the rotary axis of the filling chamber.

Further, a through-flow opening 20 is provided in the base bottom 16, at a position which does not coincide with the rotary axis 44. Via a feed line 18, the through-flow opening 20 is in fluid connection with the inner space 4 of the container 2.

One of the inflow openings of the channels 22.i can selectively be brought into fluid connection with the through-flow opening 20 by the rotation of the filling chamber bottom 12 relative to the base bottom 16 forming a part of the housing of the dosing device. In this example, the assembly at least comprises a first and a second channel 22.1, 22.2, to which it applies that the outflow opening 26.i of the first channel 22.1 is located at a first height h relative to the filling chamber bottom when the inflow opening 24.i of the first channel 22.1 is connected to the through-flow opening 20, and to which it applies that the outflow opening 26.2 of the second channel 22.2 is located at a second height h2 relative to the filling chamber bottom 12 then the inflow opening 24.2 of the second channel is connected to the through-flow opening 20. Here, it further applies that said first and second heights differ from each other. Said mutually different heights correspond to mutually different, dosed quantities of liquid that can be dispensed vi a the pour-out opening.

Figure 11:
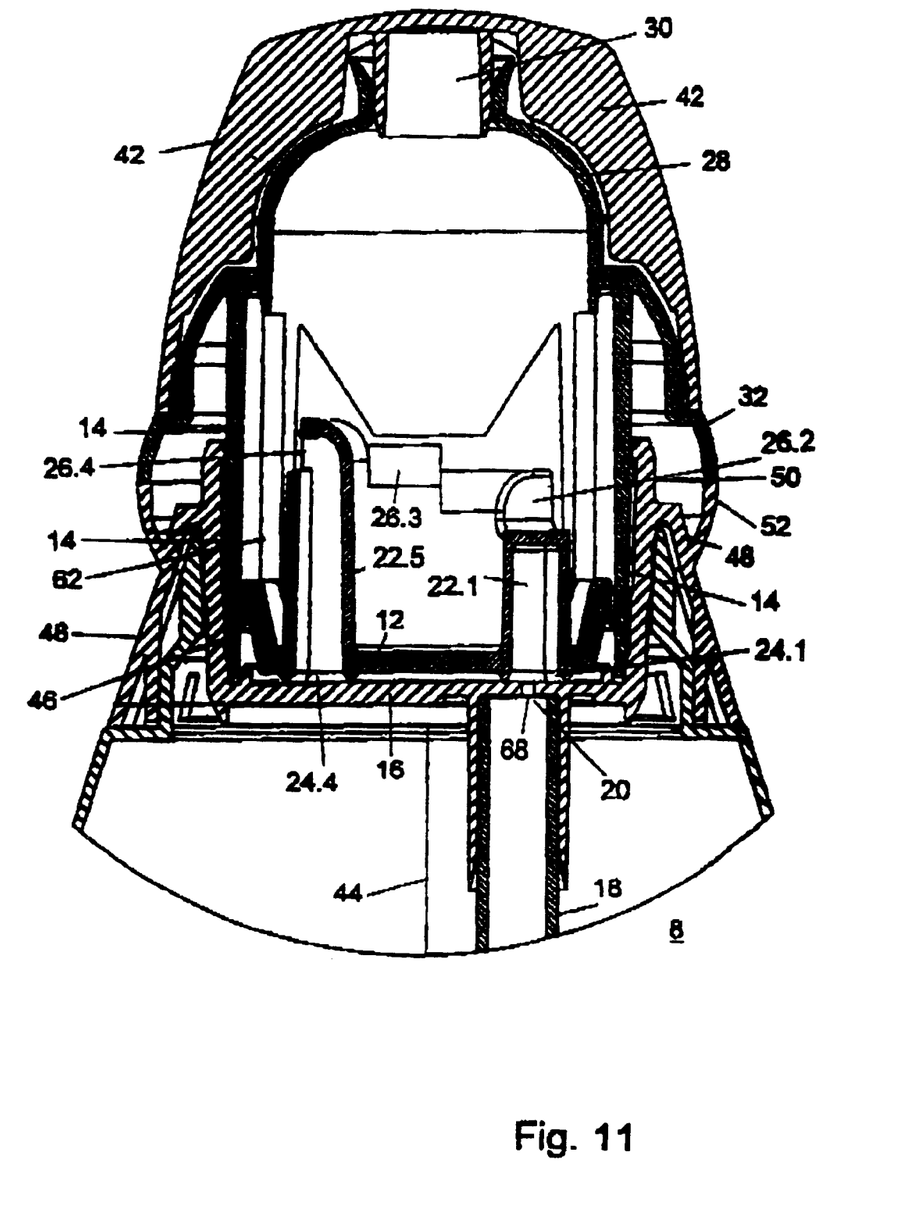
FIG. 11 shows, in detail, a part of FIG. 7.
Figure 12:
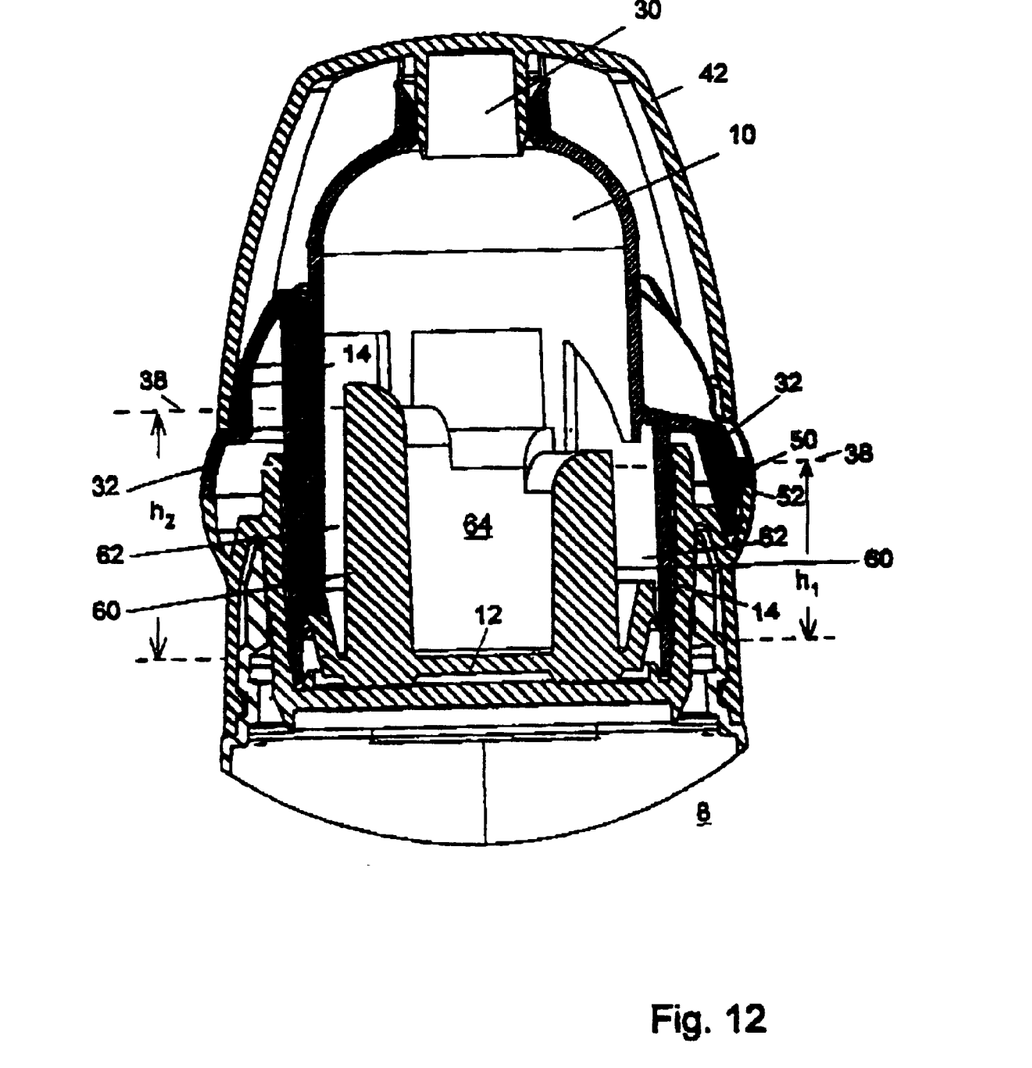
FIG. 12 shows, in detail, a part of FIG. 8.
Figure 13:
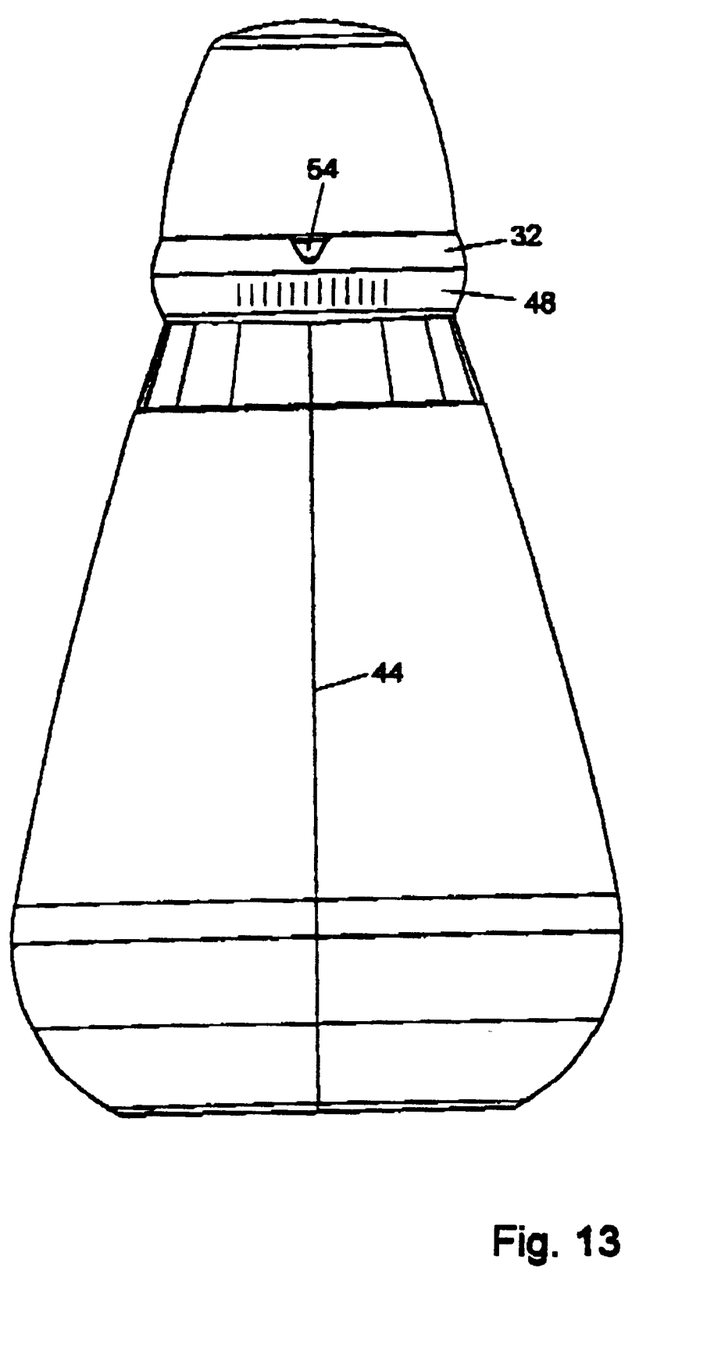
FIG. 13 is a side elevation of the assembly according to FIG. 7.

As is clearly visible in FIG. 11, the filling chamber further comprises an outer wall 32 extending outwards in radial direction from the top wall 28 of the filling chamber. The base bottom 16 further comprises a vertical side edge 46 which, adjacent its top side, is bent over into an outer wall 48 extending downwards and radially outwards.

A lower free end 50 of the outer wall 32 and an upper free end 52 of the outer wall 48 abut against each other.

In this example, the base bottom 26 with the channels 22.i on the one hand, and the vertical wall 14, the top wall 28 and the outer wall 32 on the other are manufactured from different parts. However, via snap connections and the like, the two parts are clampingly interconnected so as to be immovable and liquid-tight, and thus in fact constitute one whole.

The operation of the device is as follows. A user first selects one of the channels 22.i for filling the filling chamber 10. This is effected through rotation of the filling chamber bottom 12, i.e. through rotation of the rotation element comprising the filling chamber bottom 12 and the channels 22.i relative to the base bottom 16 and the outer wall 48 forming a housing of the dosing device. For this, a user can rotate the outer wall 32 relative to the container 2. Thus, the filling height of the filling chamber 10 is set at the same time. The user also removes the cap 42. By setting the filling height of the filling chamber 10, the quantity of liquid which will eventually be dispensed by the assembly is determined. After for instance 10 the channel 22.2 has been manipulated to a position above the through-flow opening 20 to form a liquid-tight connection therewith, a user squeezes the flexible container 2. This will cause the liquid 6 to flow via the feed line 18, through the through-flow opening 20 and via the inflow opening 24.2, upwards through the channel 22.2. Eventually, the liquid 6 will flow from the channel 22.2 into the filling chamber 10 via the outflow opening 26.2. A user squeezes the container 2 such that the filling chamber is filled with an excess of liquid. The liquid level 38 is then at a height above the outflow opening 26.2 of the channel 22.2. when, after the filling of the filling chamber 10, a user subsequently stops squeezing the container, the container 2 will be apt to return into its original condition. Consequently, the container 2 starts to suck liquid from, the filling chamber 10 back into the inner space 4 of the container 2 via the feed line 18 and the channel 22.2. The liquid level, i.e. the height of the liquid level relative to the filling chamber bottom 12, then starts to drop. When the liquid level has dropped to the outflow opening 26.2 of the channel 22.2, however, no further liquid will from back from the filling chamber into the inner space 4 of the container 2. instead, the container 12 will further be filled with air via the channel 22.2 and the feed line 18. The liquid level 38, in then exactly flush with the outflow opening 26.2 of the channel 22.2. In this manner, the height of the selected outflow opening 26.2 determines the quantity of liquid that eventually remains in the filling chamber 10 after a user has squeezed the flexible container 2 and subsequently allowed it to expand again. A user can subsequently place the assembly upside down, enabling the filling chamber 10 to empty via the pour-out opening 30. In this manner, a predetermined quantity of liquid is dispensed by the assembly in a dosed manner. When a user subsequently wishes to dispense a different quantity of liquid, he can select another channel 22.i corresponding to said quantity. In this example, it applies that for an increasing value of i, a larger quantity of liquid is dosed. As the height of the channels 22.i is accurately predetermined, a user knows precisely which quantity of liquid is dispensed by the assembly.

In this example, the base bottom 16 and the filling is chamber extend in parallel relation. This in fact means that the channels 22.i have a mutual difference of length corresponding to the height differences of the associated filling heights.

In this example, the filling chamber is further provided, at the outside thereof, with a visible thickening 54 indicating the rotational position of the filling chamber relative to the base bottom 16. For instance, a graduation may be provided on the outer wall 48, corresponding to the quantity of liquid that is dispensed in a given rotational position of che filling chamber relative to the base bottom 16. The thickening 54 then indicates on the scale which quantity of liquid has been selected.

Figure 14:
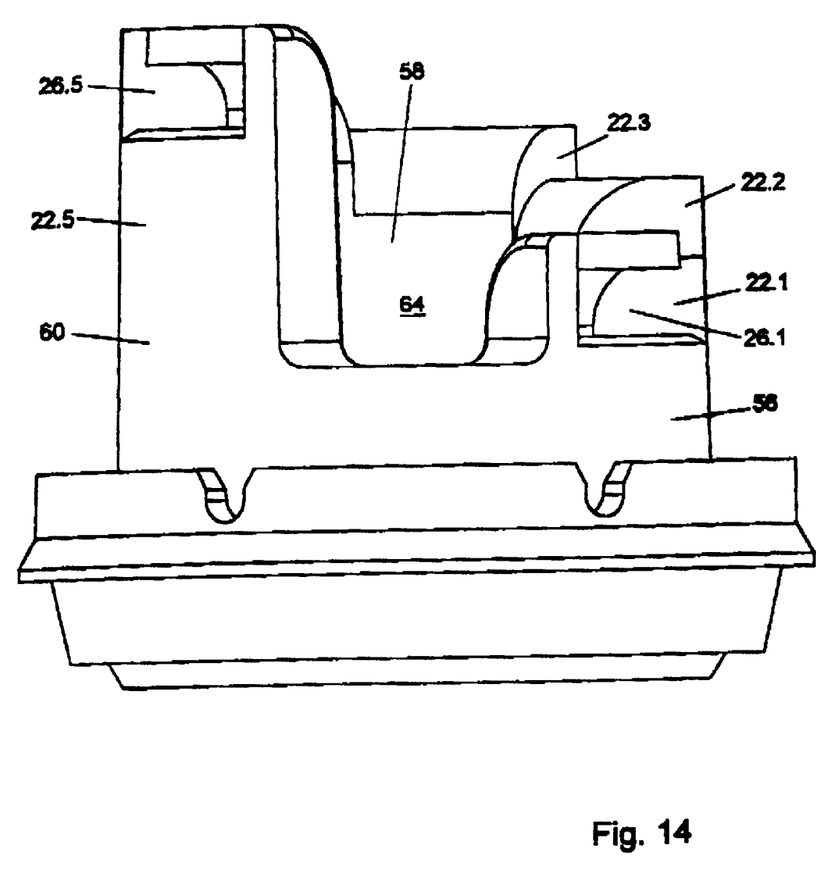
FIG. 14 is a side elevation of a part of the assembly according to FIG. 7.
Figure 15:
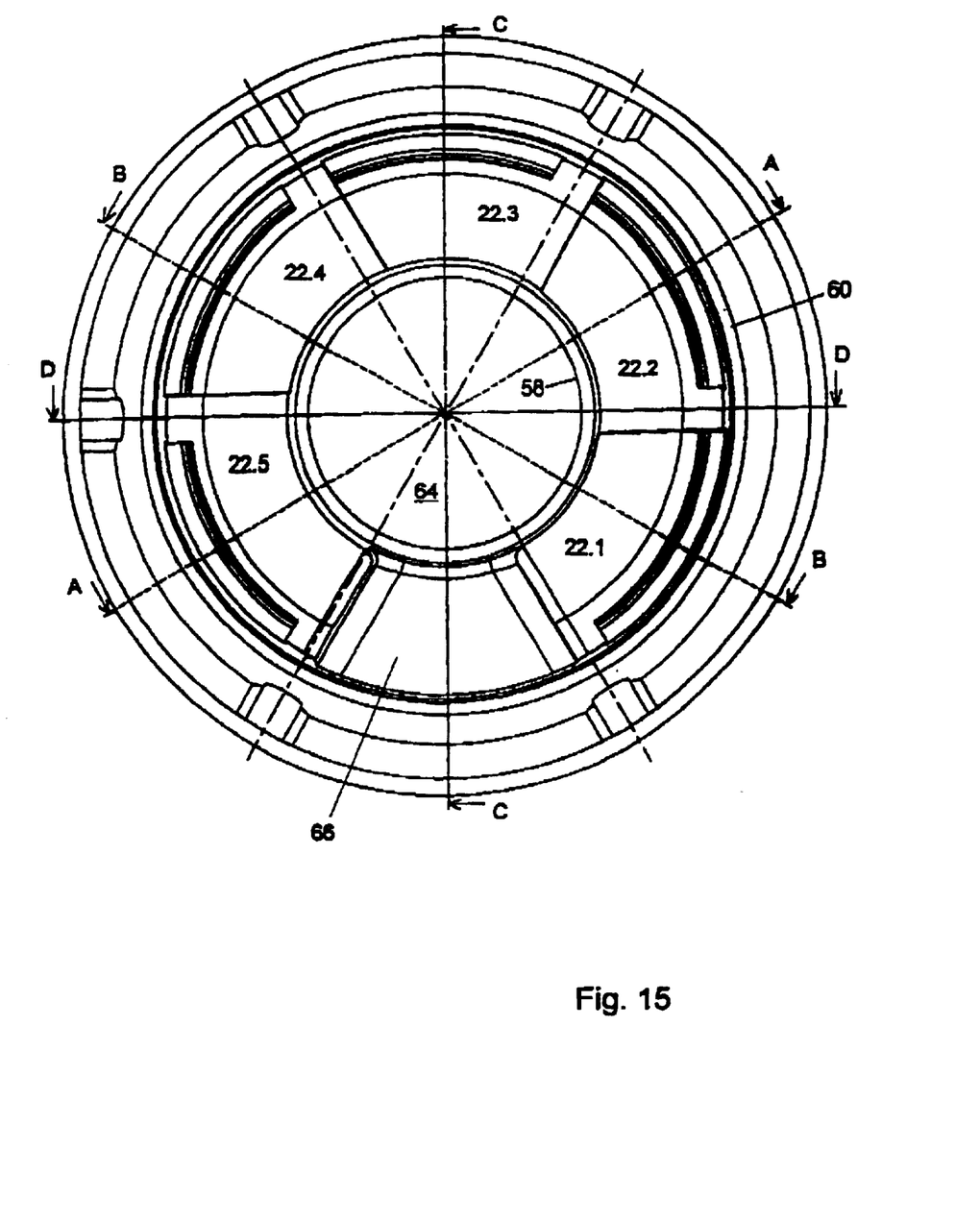
FIG. 15 is a top plan view of the part of FIG. 14.

FIGS. 14 and 15 show in detail a portion of the filling chamber, viz. the filling chamber bottom 12 with the channels 22.i, which together constitute said rotation element. This demonstrates that the filling chamber comprises a tubular housing 56, extending upwards from the filling chamber bottom 12 and fixedly connected to the filling chamber bottom 12. The tubular housing 56 comprises a circular inner wall 58 and a circular outer wall 60. The channels 22.i are located in the tubular housing 56 between the inner wall 58 and the outer wall 60. Thus, a particularly firm construction is obtained. Moreover, it applies that in use, the filling chamber is filled in a space 62 (see FIG. 12) located between the vertical wall 14 of the filling chamber and the outer wall 60 of the tubular housing. Also, the filling chamber is filled in a space 64 enclosed by the inner wall 58 of the tubular housing 56. Hence, in this manner, optimum use is made of the volume of the filling chamber.

Hence, to the dosing device according to the invention, it applies that only the vertical sidewall 14 and the filling chamber bottom 12 of the filling chamber 10 form the boundaries of the inner space 4 of the filling chamber that is filled with the liquid. The tubular housing does not bound this inner space, because the entire housing is in fact included and partially immersed in a liquid bath located in the filling chamber. As stated, the inner space of the filling chamber is thus optimally used A further advantage of the assembly according to the invention is that the filling chamber bottom 12 and the vertical sidewall 14 in fact form a bowl-shaped component which is not rotatable relative to the channels 22.i. After all, the channels 22.i rotate along with the bowl-shaped housing of the filling chamber. Further, it applies that the top wall 28 likewise rotates along with the vertical sidewall 14, simply because the vertical sidewall 14 and the top wall 28 are fixedly interconnected. This again has the advantage that during pouring, there is no risk of liquid leaving the filling chamber via an opening other than said pour-out opening. Indeed, the filling chamber does not have its top side provided with parts rotating relative to each other and having a mutual seal.

The chance of the channels becoming clogged is almost ruled out, because the inflow and outflow openings of each channel are in principle located at the beginning and end of the relevant channel. This implies that in use, the entire channel will be flowed through by the lied. This again has as a result that the chance of the channels becoming clogged by dried-in liquid rests is small.

An can be sees in FIG. 14, at a particular position 66, the filling chamber bottom 12 is not provided with a channel 22.i. When this portion 66 of the filling chamber bottom 12 is manipulated into a position above the through-flow opening 20 by rotation of the filling chamber bottom 12 and in this example by rotation of the entire filling chamber 10 relative to the base bottom 16, the through-flow opening 20 is closed off. Moreover, the pour-out opening 30 can further be closed off by means of the cap 42.

In accordance with a further elaboration of the assembly according to the invention, a restriction 68 is provided in the through-flow opening 20. In this example, this restriction has a through-flow area which is smaller than 2 square millimeters. Hence, the through-flow opening has a through-flow area which is smaller than 2 square millimeters. Moreover, it applies that the through-flow Opening 26, i.e. the restriction 68 arranged in the base bottom 16, has a height which is less than 2 mm and more than 1 mm. The great advantage of the thus dimensioned through-flow area is that the magnitude of the liquid flow from the container to the selected channel 22.i is limited by the restriction. Also when the container 2 is squeezed very firmly, the magnitude of the liquid flow will remain limited. This prevents the filling chamber 10 from being filled so quickly that it flows over. On the other hand, the selected size of the through-flow opening has no adverse effect on causing the excess of liquid present in the filling chamber to flow back when, after squeezing, the container is apt to resume its original shape. This will still be completed within a few seconds. As the restriction 68 is arranged in the through-flow opening 20, it can be used for each channel 22.i. Moreover, the restriction has the advantage that no foaming occurs in the filling chamber when it is being filled wit liquid from the container. This of particular importance then the container is filled with concentrated coffee. After all, it is undesired that concentrated coffee is dispensed in a dosed manner which is provided with a large quantity of foam. This proves to have a negative effect on the eventual flavor of the coffee when the coffee extract is diluted with hot water.

What is claimed is:

1. A liquid dispensing assembly comprising:
   a flexible container defining a space therein adapted to store a liquid;
   dosing device connected to said container and adapted for dispensing the liquid from said container, said dosing device comprising:
      a feed line in fluid communication with said space in said flexible container;
      a base bottom defining a through-flow opening therethrough, said through-flow opening being in fluid communication with said feed line;
      a filling chamber rotatably mounted on and substantially in contact with said base bottom, said filling chamber comprising a filling chamber bottom; and
   at least two channels disposed within said filling chamber on said filling chamber bottom, each of said channels defining an inflow opening and an outflow opening therein such that for each of said channels said inflow and outflow openings are in fluid communication with one another, each of said outflow openings being in fluid communication with said filling chamber, and each of said outflow openings being at a unique height, such that a height of each of said outflow openings is different from a height of all other of said outflow openings;
   wherein
   said filling chamber is rotatable relative to said base bottom such that a selected channel selected from said channels may be individually and exclusively aligned with said through-flow opening, such that said inflow opening of said selected channel is in fluid communication with said through-flow opening;
   a squeezing of said flexible container causes the liquid to flow from said container through said feed line, said through-flow opening, said inflow opening of said selected channel, said outflow opening of said selected channel, and into said filling chamber; and
   when the squeezing of said flexible container is sufficient to fill said filling chamber with the liquid to a height greater than said height of said outflow opening of said selected channel, the liquid drains out of said filling chamber through said outflow opening of said selected channel, said inflow opening of said selected channel, said through-flow opening, and said feed line into said flexible container until said filling chamber is filled to said height of said outflow opening of said selected channel.

2. An assembly according to claim 1, wherein said filling chamber further comprises a sidewall fixedly connected to said filling chamber bottom.

3. An assembly according to claim 2, wherein said filling chamber and said channels comprise an integral tubular housing, said tubular housing comprising a circular outer wall disposed within said sidewall and a circular inner wall disposed within said outer wall, said channels being disposed between said inner wall and said outer wall, such that said filling chamber comprises a first space defined between vertical wall and said outer wall and a second space defined by said inner wall, such that the squeezing of said flexible container causes the fluid to fill said first and second spaces.

4. An assembly according to claim 1, wherein said inflow openings are said filling chamber bottom.

5. An assembly according to claim 1, wherein said filling chamber comprises a top wall defining a pour-out opening therethrough.

6. An assembly according to claim 5, said dosing device further comprises a cap adapted to prevent a flow of liquid through said pour-out opening.

7. An assembly according to claim 1, each of said channels is of a unique length corresponding to said unique height of each of said outflow openings.

8. An assembly according to claim 7, wherein each of said channels comprises a top side, and said outflow opening of each of said channels defined adjacent said top side of each of said channels.

9. An assembly according to claim 1, wherein said filling chamber bottom is connected to said base bottom so as to rotate about a rotary axis perpendicular to said base bottom.

10. An assembly according to claim 8, wherein said filling chamber bottom is connected to said base bottom so as to rotate about a rotary axis perpendicular to said base bottom, and wherein said top sides of said channels deflect radially outwards from said rotary axis.

11. An assembly according to claim 1, wherein said filling chamber bottom is adapted to be rotated such that none of inflow openings is in fluid communication with said through-flow opening, whereby said container said filling chamber are not in fluid communication.

12. An assembly according to claim 1, wherein said base bottom and said filling chamber bottom are substantially parallel.

13. An assembly according to claim 1, wherein said through-flow opening has an area smaller than 2 square millimeters.

14. An assembly according to claim 13, wherein said through-flow opening has an area smaller than 1.5 square millimeters.

15. An assembly according to claim 13, characterized in that a height of said through-flow opening is less than 2 mm and more than 1 mm.

16. An assembly according to claim 1, wherein said dosing device comprises more than two channels.

17. A dosing device adapted for use in a liquid dispensing assembly, said dosing device comprising:

a feed line adapted for fluid communication with a flexible container containing a liquid;

a base bottom defining a through-flow opening therethrough, said through-flow opening being in fluid communication with said feed line;

a filling chamber rotatably mounted on and substantially in contact with said base bottom, said filling chamber comprising a filling chamber bottom; and at least two channels disposed within said filling chamber on said filling chamber bottom, each of said channels defining an inflow opening and an outflow opening therein such that for each of said channels said inflow and outflow openings are in fluid communication with one another, each of said outflow openings being in fluid communication with said filling chamber, and each of said outflow openings being at a unique height, such that a height of each of said outflow openings is different from a height of all other of said outflow openings;

wherein said filling chamber is rotatable relative to said base bottom such that a selected channel selected from said channels may be individually and exclusively aligned with said through-flow opening, such that said inflow opening of said selected channel is in fluid communication with said through-flow opening;

a squeezing of the flexible container causes the liquid to flow from the container through said feed line, said through-flow opening, said inflow opening of said selected channel, said outflow opening of said selected channel, and into said filling chamber; and when the squeezing of the flexible container is sufficient to fill said filling chamber with the liquid to a height greater than said height of said outflow opening of said selected channel, the liquid drains out of said filling chamber through said outflow opening of said selected channel, said inflow opening of said selected channel, said through-flow opening, and said feed line into the flexible container until said filling chamber is filled to said height of said outflow opening of said selected channel.

\* \* \* \* \*